United States Patent
Tong et al.

(10) Patent No.: US 9,477,758 B1
(45) Date of Patent: Oct. 25, 2016

(54) AUTOMATIC IDENTIFICATION OF RELATED ENTITIES

(75) Inventors: Simon Tong, Palo Alto, CA (US); Jeffrey Adgate Dean, Palo Alto, CA (US); Sanjay Ghemawat, Mountain View, CA (US)

(73) Assignee: GOOGLE INC., Mountain View, CA (US)

(*) Notice: Subject to any disclaimer, the term of this patent is extended or adjusted under 35 U.S.C. 154(b) by 969 days.

(21) Appl. No.: 13/553,731

(22) Filed: Jul. 19, 2012

Related U.S. Application Data

(60) Provisional application No. 61/563,501, filed on Nov. 23, 2011.

(51) Int. Cl.
  *G06F 7/00* (2006.01)
  *G06F 17/30* (2006.01)

(52) U.S. Cl.
  CPC .............................. *G06F 17/30864* (2013.01)

(58) Field of Classification Search
  CPC ................................................ G06F 17/30864
  See application file for complete search history.

(56) References Cited

U.S. PATENT DOCUMENTS

| | | | |
|---|---|---|---|
| 7,350,187 B1 | 3/2008 | Tong et al. | |
| 8,346,864 B1* | 1/2013 | Amidon | H04L 65/1069 709/204 |
| 8,880,607 B1* | 11/2014 | Merom et al. | 709/204 |
| 2010/0268600 A1* | 10/2010 | Banko | G06Q 30/0254 705/14.52 |
| 2010/0306249 A1 | 12/2010 | Hill et al. | |
| 2011/0055234 A1* | 3/2011 | Miettinen | G06F 17/30985 707/755 |
| 2013/0124437 A1* | 5/2013 | Pennacchiotti et al. | 706/12 |

OTHER PUBLICATIONS

Chitu, "Google Sets Will be Shut Down," Aug. 27, 2011, retrieved from <http://googlesystem.blogspot.com/2011/08/google-sets-will-be-shut-down.html>.

\* cited by examiner

*Primary Examiner* — Loan T Nguyen
(74) *Attorney, Agent, or Firm* — McDermott Will & Emery LLP

(57) ABSTRACT

In one aspect, the present disclosure can be embodied in a method that includes identifying a collection of entities from one or more data sources, calculating a score for subsets of entities from the collection based on one or more seed entities associated with the collection, identifying one or more entities from each of the subsets based on the calculated score, assigning the calculated score to the identified one or more entities from the respective subset, and ranking the one or more entities based on the assigned score, so as to identify entities in the collection that are related to the one or more seed entities.

30 Claims, 7 Drawing Sheets

US 9,477,758 B1

AUTOMATIC IDENTIFICATION OF RELATED ENTITIES

CROSS REFERENCE TO RELATED APPLICATIONS

The present application claims priority benefit under 35 U.S.C. §119(e) from U.S. Provisional Application No. 61/563,501, filed Nov. 23, 2011, which is incorporated herein by reference in its entirety.

BACKGROUND

The present disclosure relates generally to identifying related information, and, more particularly, to automatically creating collections (e.g., lists) of related items.

The advancement of communication services that are publicly available to different users over the Internet or World Wide Web ("web") has not only allowed such users to share information quickly and easily amongst one another, but to also establish social connections with other users as part of a virtual social network. For example, social networking services may be designed, in part, to store and provide information about the personal or professional social contacts of a user. Such social networking services generally provide the user with a capability to declare different lists or groups for the user's social contacts based on, for example, the type of social connection that the user may have with the members of a particular group. The user may define a list or grouping of social connections corresponding to the user's family members and another list of connections corresponding to various colleagues associated with the user's workplace. In addition, certain social networking services may provide the user with suggestions for adding new social connections based on, for example, the user's existing social connections within one or more publicly available lists or social groups as declared by the user.

SUMMARY

The disclosed subject matter relates to automatically identifying related entities for a given set of initial entities. For example, the supplied entities may be users in a social networking web site. Accordingly, a set of different users may be determined automatically given the initial set as an input. In one innovative aspect, the present disclosure can be embodied in an example method for identifying related list entities, where a set of lists is identified from one or more sources of lists. Each list in the set may include one or more entities or items. A list score for each list in the set of lists is calculated based on one or more seed entities associated with the set. A subset of lists is identified from the set of lists based on the calculated list scores. The calculated list score is assigned to the respective one or more entities in each list of the identified subset based on their associated background probabilities. The one or more entities in each list of the subset are then ranked based on the assigned lists scores, so as to identify entities related to the one or more seed entities. Other aspects can be embodied in corresponding systems, apparatus, including computer program products. In another innovative aspect, the present disclosure can be embodied in a method that includes identifying a collection of entities from one or more data sources, calculating a score for subsets of entities from the collection based on one or more seed entities associated with the collection, identifying one or more entities from each of the subsets based on the calculated score, assigning the calculated score to the identified one or more entities from the respective subset, and ranking the one or more entities based on the assigned score, so as to identify entities in the collection that are related to the one or more seed entities.

These and other embodiments can include one or more of the following features.

The example method may further include determining a background probability for each entity in the set of lists. The background probability indicates a frequency that each entity appears in the set of lists. The list score is calculated for each list in the set of lists based on the one or more seed entities associated with the set and the determined background probabilities associated with the one or more entities in each list, and the calculated list score is assigned to the respective one or more entities in each list of the identified subset based on the background probabilities associated with the corresponding one or more entities. A number of lists are determined in which each of the one or more entities appears in the set of lists, and the background probability for each of the one or more entities is calculated based on the determined number of lists relative to a total number of lists in the set of lists. A number of occurrences of each of the one or more entities as an element in a list from the set of lists is determined and the background probability for each of the one or more entities is calculated based on the determined number of occurrences relative to a total number of elements in all lists in the set of lists. The background probability is a predetermined constant value. The entities, including the one or more seed entities, in the set of lists are users of a social networking service and each list in the set of lists corresponds to a social group including a subset of the users of the social networking service. Explicit social connections between the users of the social networking service are identified based on a social graph associated with the social networking service, and the set of lists are generated based on the identified social connections. The one or more seed entities are specified by a user of the social networking service, prior to the identification of the set of lists, and the user is an owner of at least one list including the one or more seed entities from the set of lists. Implicit connections between a user of the social networking service and at least one of the seed entities are identified based on the user's interactions with a content item associated with the seed entity, and the content item is accessible to the seed entity and at least the user via an interface of the social networking service. The list score for each list in the set of lists is calculated based on quality metrics for the content item associated with the seed entity. The quality metrics represent a level of interest for the content item, and the level of interest is indicated by other users of the social networking service via the interface of the social networking service.

In an further innovative aspect, a probabilistic model for the one or more entities in each list in the set is generated based on the one or more seed entities. The calculation of the list score may involve: calculating a positive class component of the list score for each list in the set of lists based on the generated probabilistic model, calculating a negative class component of the list score for each list in the set of lists based on the generated probabilistic model and the background probabilities associated with the one or more entities in each list, and computing the list score for each list in the set of lists based on the calculated positive and negative class components of the list score. Each list in the set of lists can have a list owner and an example method also includes: determining whether reciprocal connections exist between each of the one or more entities and the respective list owner for each list in the set of lists, adjusting the positive or negative class components of the list score for each list based on the determination, so as to give relatively greater weight to lists including at least one entity having the reciprocated link, and updating the computed list score for each list based on the adjusted positive and negative class components. Two or more lists in the set of lists for which the list owner is identical; and merging the identified two or more lists into a single list for the set of lists. It may be determined whether non-independent data is included for each list in the set of lists based on popularity metrics associated with at least a portion of each list, and the positive or negative class components of the list score for each list may be adjusted based on the determination, so as to give relatively lower weight to lists including non-independent data; and updating the computed list score for each list based on the adjusted positive and negative class components. A popularity factor for each of the one or more entities in each list in the set of lists is determined, the positive or negative class components of the list score for each list are adjusted based on the determined popularity index of the one or more entities, so as to assign relatively lower weight to lists including at least one entity having a relatively high popularity factor, and the computed list score is updated for each list based on the adjusted positive and negative class components. The identified set of lists are filtered to include one or more lists having at least one seed entity, wherein the calculating, identifying, assigning and ranking steps are performed only for the one or more lists in the filtered set of lists. A preliminary list score is computed for each list in the filtered set of lists based on a number of seed entities in each list in relation to a length of each list, in which the length represents a total number of entities in each list, and the lists in the set are filtered based on the computed preliminary list score of each of the lists. The length of each list is quantized based on the total number of entities in the list; and computing the preliminary list score for each list in the filtered set of lists based on the number of seed entities in each list in relation to the quantized length of each list. The computed preliminary list score is modified for each list in the filtered set of lists that includes two or more seed entities, so as to assign relatively greater weight to lists including at least two or more seed entities.

These and other embodiments can include one or more of the following advantages: providing a capability to adaptively change search parameters based on popularity or other relevant characteristics of an entity when searching for related entities in lists of entities and improving the quality of automated search results based on such capability in comparison to conventional techniques.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

For purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details.

The disclosed subject matter relates to automatically identifying related entities for a given set of initial entities. For example, the supplied entities may be users, e.g., a person or an organization, of a social networking web site or service. Accordingly, a list of related users associated with the social networking site or service may be determined automatically given an initial set of users as an input. The term "list" is used herein to refer to a collection or set of one or more entities (e.g., users of a social networking service) and is not intended to be limited to a group of entities organized in list format. Although the entities and associated lists are described in the examples below in the context of social networking and lists of users of a social networking service, the subject technology disclosed herein is not intended to be limited thereto. It would be apparent given this description that the techniques described herein may be applied to different types of entities in other contexts.

Figure 1:
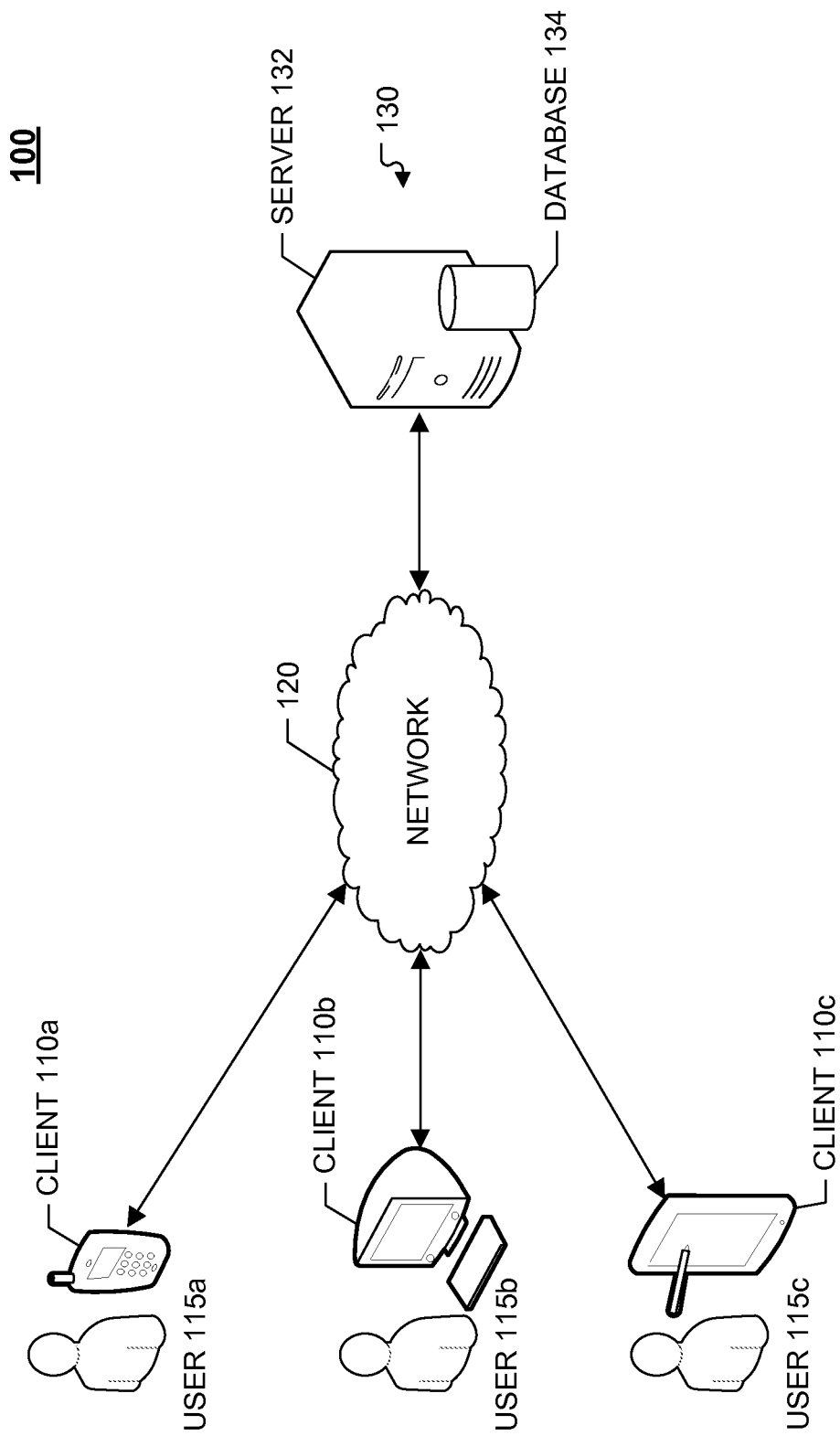
FIG. 1 illustrates an example network environment for implementing techniques to automatically identify related entities for a given set of initial entities.

FIG. 1 illustrates an example network environment 100 for implementing techniques to automatically identify related entities for a given set of initial entities. A network environment 100 includes client devices 110a, 110b and 110c (hereinafter "clients 110a-c"), and a computing system 130. Clients 110a-c communicate with one or more servers 132 of computing system 130, for example, through network 120. As shown in FIG. 1, computing system 130 includes at least one server device 132 and at least one computer-readable storage device or database 134. Although only server 132 and database 134 are shown, additional servers and/or databases may be used as may be necessary or desired for a particular implementation. Further, server(s) 132 are communicatively coupled to database(s) 134. Database 134 may store any type of data accessible by server(s) 132. Such data may include, for example and without limitation, data for one or more lists of items or entities. As will be described in further detail below, the stored data may include lists of users organized within a social graph for a social networking service.

Clients 110a-c can be a general-purpose computer with a processor, local memory, a display, and one or more input devices, e.g., a keyboard or a mouse. Examples of different computing devices that may be used to implement any of clients 110a-c include, but are not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Alternatively, each of clients 110a-c can be a specialized computing device, for example, a mobile handset or tablet computer. Similarly, server 132 can be implemented using any general-purpose computer capable of serving data to any of clients 110a-c. Examples of computing devices that may be used to implement server 132 include, but are not limited to, a web server, an application server, a proxy server, a network server, or a group of computing devices in a server farm.

In some aspects, the computing devices may communicate wirelessly through a communication interface (not shown), which may include digital signal processing circuitry where necessary. The communication interface may provide for communications under various modes or protocols, e.g., Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, e.g., using a Bluetooth, WiFi, or other such transceiver.

In some aspects, network environment 100 can be a distributed client/server system that spans one or more networks, e.g., network 120. Network 120 can be any network or combination of networks that can carry data communication. Such a network can include, but is not limited to, a cellular network, a local area network, medium area network, and/or wide area network, e.g., the Internet, or a combination thereof for communicatively coupling any number of mobile clients, fixed clients, and servers. In some aspects, each of clients 110a-c can communicate with server 132 via a virtual private network (VPN), Secure Shell (SSH) tunnel, or other secure network connection. In some aspects, network 120 may further include a corporate network (e.g., intranet) and one or more wireless access points.

In an example, clients 110a-c may each be configured to provide computing system 130 with a set of input items or "seeds" for generating a list of entities or items related to the input or seed items. As will be described in further detail below, the set of input items or seeds may be determined based on user input or prior interactions of the user, e.g., any of users 115a-c of clients 110a-c. For example, client 110a may communicate such input or seed items to computing system 130 via network 120. Further, client 110a may be configured to send these items, for example, in response to input from user 115a. In an example, server 132 uses the seed items received from clients 110a-c to find items related to the seed items in sets of lists. As will be described in further detail below, such lists may be available from one or more remote devices connected to server 132 via network 120. Further, such lists may be available from a local data store or data repository, e.g., database 134, that is accessible to server 132. In an example, the locally stored list data includes lists that have been compiled from different data sources (e.g., across network 120) and stored in database 134 or other database(s) for processing by server 132.

Figure 2:
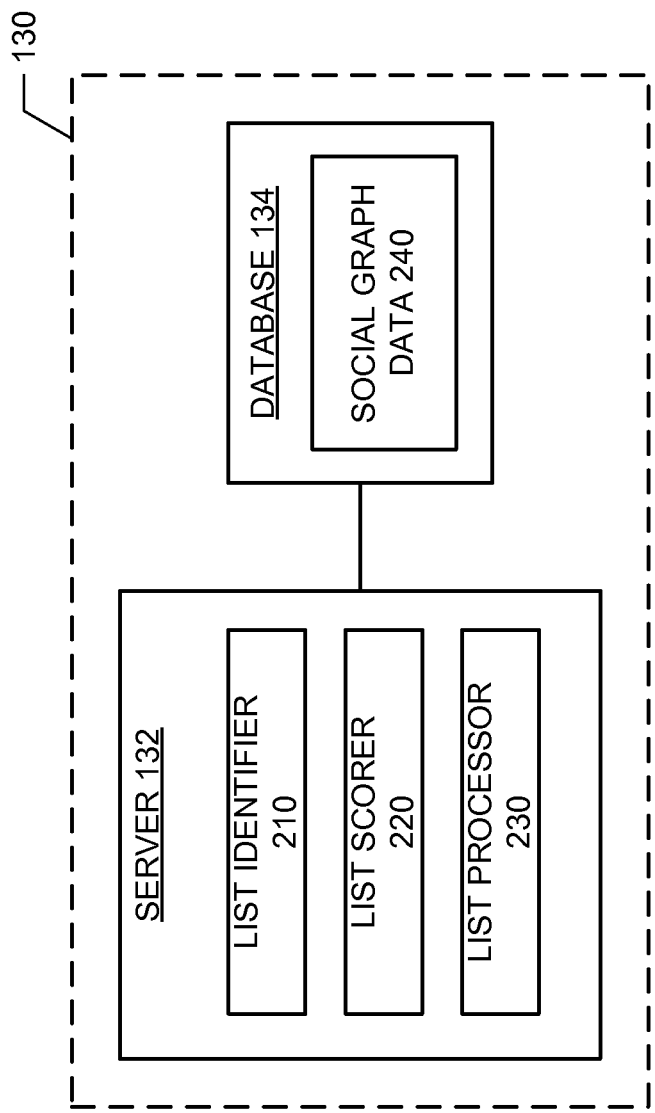
FIG. 2 illustrates an example of the server in addition to the associated database as shown in the network environment of FIG. 1.

FIG. 2 is an example functional block diagram showing portions of server 132 and database 134 of computing system 130 of FIG. 1, as described above. As shown by the example of FIG. 2, server 132 includes a list identifier 210, a list scorer 220 and a list processor 230. Also, database 134 includes social graph data 240 corresponding to at least one social graph of linked users in association with a social networking web site or service, as will be described in further detail below. Although not shown in FIG. 2, server 132 may include additional components for implementing the automatic identification of related entities functionality, as described herein. Similarly, database 134 may be used to store other types of data in addition to social graph data 240. These other components and data are not shown in FIG. 2. Further, list identifier 210, list scorer 220 and list processor 230 are described herein using computing system 130 of FIG. 1. However, it should be noted that embodiments of list identifier 210, list scorer 220 and list processor 230 are not intended to be limited thereto, and that embodiments may be implemented using any server or other computing device.

In an example, list identifier 210 is configured to identify existing lists having one or more entities or items from different sources of information. These sources may include, for example, remote data sources located across a network (e.g., network 120 of FIG. 1, as described above) in addition to local data sources, e.g., database 134. List identifier 210 may identify such lists using conventional or other techniques for identifying lists of information. In an example, list identifier 210 identifies lists based on publicly available information from different web pages over the Internet. For example, list identifier 210 may derive a list from a web page or metadata associated with the page including, but not limited to, particular elements or tags of a markup language indicating an existing list of items on the web page, e.g., <UL>, <OL>, <DL> and <H1>-<H6> tags for the Hypertext Markup Language (HTML). In a further example, an existing list of items may be identified based on items placed in a table or items separated by commas, semicolons, tabs or other delimiter. Additionally, list identifier 210 may create an index, e.g., a hit list index, to improve efficiency for identification of additional lists based on previously identified lists. The hit list index may include a mapping of items to the lists in which the items appear.

In addition to various terms or phrases from a web page or document, the entities or items in a list may correspond to, for example, different users of a social networking service. In an example, different users may be linked to each other based on, for example, explicitly declared social connections between them. However, it should be noted that the type of social connections between different users identified by list identifier 210 are not limited to explicitly declared connections, and lists of users or other entities may be identified based on implicit relationships between them. For example, implicit relationships may be derived based on the interactions between different entities in association with the same data source (e.g., an interactive portion of a web page). In a particular example, a list of users may be identified based on a user's interactions with items posted by another user as part of a message thread or online forum of a web site.

In an example, list identifier 210 identifies lists of users associated with a social networking service or site using social graph data 240. The lists may correspond to, for example, different social groups of each of the various users connected in a social graph data structure, as noted above. For example, the information stored for a user in social graph data 240 may include a set of lists representing various sets of users associated with different social groups or types of social connections within the user's social network. Such groups may be asymmetric or symmetric.

In an example, an asymmetric social group for a user may be in the form of a social circle including different social connections that are centered around the user. As used herein, a "social circle" may be any collection or set of social connections or contacts for a user. While a social circle can be described from the perspective of an individual user as the center of a particular collection of socially interconnected people, as described above, a social circle may be described also as a set of social connections from the aggregate perspective of a collection of socially interconnected people. A social circle can have narrowly defined boundaries, where all of the members of the social circle may be familiar with one another, and permission may be required for a member to join a social circle.

In an example, each user of an electronic device (e.g., each of users 115a-c of client devices 110a-c of FIG. 1, as described above) may define a social circle as a set or collection of social connections reflecting a particular type of real-world social circle of the user's social network. For example, the user may have different groups of friends, coworkers and family, and there may be some overlap among those groups (e.g., a coworker who is also considered to be a friend, a family member who is also a coworker). Through the creation and use of social circles, the user of a social networking service can organize and categorize social networking contacts into various different groupings. Further, the user may assign certain access rights or user permissions to members of each grouping/circle so as to control the distribution and visibility of the user's personal information and affiliations with respect to the user's individual social connections or contacts within the social networking service. Other examples of social network groups may include a group of users in a computer or mobile phone-based chat session, for example, a short message service (SMS) chat session or an instant messaging (IM) chat session, an individual profile in a social networking service, or a combination of two or more individual profiles in the social networking service.

In addition to the social connections between different users and their respective profile information, as described above, other information that may be associated with the social graph data 240 may also include different content items that are associated with each social network group or social circle of each user. Examples of such content items include, but are not limited to, one or more photographs, videos, "checked-in" geographic locations, articles, reviews of geographic points of interest, text, audio or video chat room interfaces, status updates or calendar events. For example, content items may be added to the information associated with the social network group or circle by one or more of its members.

Further, list identifier 210 may generate a list of users based on user interactions related to a content item, where such interactions indicate implicit connections between the users. The user interactions may be associated with, for example, a virtual chat room or online discussion forum having an interface that enables users to post content items and interact in various ways with the items posted by other users. For example, a user X1 may post a content item to the forum, and users X2, X3, and X4 may interact (e.g., via the provided interface) with the posted item, for example, by posting comments in a discussion thread or stream related to the item, sharing the item with other users, adding the item to a favorites list or performing some other action related to the item. As social connections between these users may be implied based on their interactions related to the content item, list identifier 210 may generate a list including users X1, X2, X3 and X4. Alternatively, the inclusion of users within such an implied list may be restricted based on, for example, any explicitly declared connections associated with the user (X1) that initially posted the content item. Using the example above, the generated list of users may be restricted to user X1 and only those users that X1 is following (i.e., for which an explicitly declared social connection has been established).

The user interactions, as described above, may include, for example, user interactions on a public forum or chat interface hosted at a public web site in addition to any interactions between users in a similar forum or chat interface that is provided by the social networking site. Further, this may include interactions between users of the social networking site, for example, in a forum that is accessible only to members of a particular social circle.

The content items may be provided to database 134 by users of the social networking service. Alternatively, the content items may be gathered from sources external to the database 134 using, for example, a web crawler. In some implementations, users of the social networking service may opt out of having data about the user gathered from sources external to the social networking service being brought into the social networking service. In one implementation, the user may indicate that he/she wishes to opt out of having such data brought into the social networking service by modifying his/her account settings with the social networking service.

In an example, a user may be considered the creator or "owner" of the social circle for which the user has chosen to follow one or more other users of a social networking service. Likewise, the individual user, who is the owner of the social circle in this example, may also be a member of another social circle owned by one of the members in the user's social group/circle. As the different social circles within the social networking service may be asymmetrically related, this user may not be a member of any of the social circles associated with various other members of the user's social circle. For example, each user may have the ability to follow one or more other users through social connections that are associated with a social networking service or site. In an example, list identifier 210 uses social graph data 240 to identify at least a portion of the lists of users of such a social networking service based on social connections that may be represented using a social graph, as will be described in further detail below with respect to FIG. 3.

Figure 3:
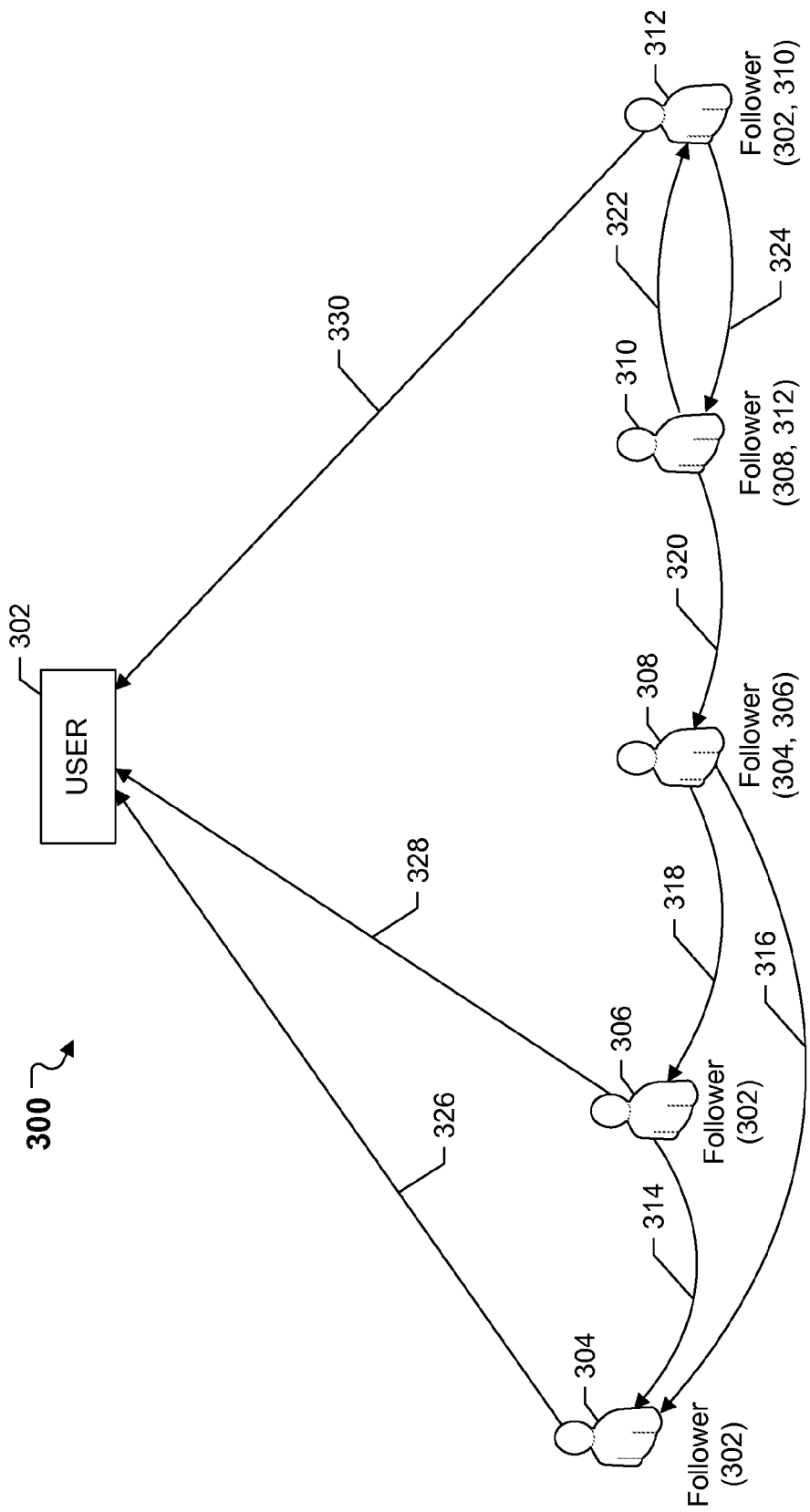
FIG. 3 illustrates an example social graph including the social connections between different users of a social networking service.

FIG. 3 illustrates an example of a social graph 300 including the social connections between different users of a social networking service. As shown in FIG. 3, the example social graph 300 corresponds to one or more social circles associated with a user 302, and includes various members (users 304, 306, 308, 310 and 312). In an example, the social graph 300 may represent a union of all members of public circles for user 302. For example, social graph 300 may be determined based on user 302's use of a computer-implemented social networking service or web site, as described above. For example, user 302 can generate a profile within the social networking service. Further, user 302 can create a social circle by digitally associating the user's generated profile with the profiles of one or more other users of the social networking service (e.g., users 304, 306, 308, 310 and 312). Also, as described above, user 302 may upload content items via the social networking service to be published in association with the social circle.

As shown by the connections or edges of social graph 300, some of the members of user 302's public circle, i.e., user 304, 306 and 312 are also followers of user 302, as indicated by the edges 326, 328 and 330 (labeled "follower (302)"), respectively. For example, a follower of user 302 may be any other user of the social networking service having a public circle in which user 302 is also a member. Similarly, edges 314 and 316 of social graph 300 indicate that both user 306 and user 308, respectively, are followers of user 304 within the social networking service. Social graph 300 also shows the following connections between the remaining members of the user 302's social circle(s): user 308 is a follower of user 306, as indicated by edge 318; user 310 is a follower of both user 308 and user 312, as indicated by edges 320 and 322, respectively; and user 312 is a follower of user 310, as indicated by edge 324. In the example social graph 300 shown in FIG. 3, user 310 is not a follower of user 302 within the social networking service. Instead, user 310 may be another user of the social networking service that has limited access to the information and/or posts provided by user 302. As for user 312, however, in addition to following user 302 as noted above, user 312 is also following user 310, as indicated by edge 322. However, user 312 is not following users 304, user 306 or user 308.

For example, user 302 may have previously granted permission allowing user 304 and user 306 to follow user 302 and add the appropriate social connection to user 302 in the social networking service. This enables any public information and/or data items provided by user 302 to be shared with user 304 and user 306. In some aspects, user 302 is able to establish a privacy setting for each content or data item associated with the user 302's profile such that only certain members of user 302's public circles, or a subset of contacts of user 302 within the social networking service, are able to view and interact with such item. Likewise, other users in social graph 300 may have granted prior approval for similar social connections to their followers. The prior approval granted by each user may have been, for example, in the form of a response to an automated notification indicating a request to be followed by another user or added to the other user's social circle. The automated notification may be sent to the respective user's computing device via, for example, an interface provided for the social networking service at the user's device.

However, it should be noted that such explicit permission may not be required for establishing social connections or sharing information between different users. For example, user 304 may include user 302 in a social circle created and customized by user 304, which allows information sharing between the users without any explicit permission from user 302. Further, it should be noted that any type of sharing model for users associated with a social networking site or service may be used and that the subject technology as described herein is not intended to be limited to any one particular implementation.

Referring back to FIG. 2, each of the lists identified by list identifier 210 may be scored or ranked by list scorer 220 based on its likelihood to include entities that are independently related to a given set of input entities or "seeds," as described previously. As noted previously, the term "list" is used herein to refer to a collection or set of one or more entities (e.g., users of a social networking service) and is not intended to be limited to entities organized as a list or in list format. In an example, the seeds are supplied by a client device (e.g., client 110a of FIG. 1, as described above) based on input by a user (e.g., user 115a). For example, the user may be a user of a social networking service or site that is accessible via a graphical user interface displayed at the client device. As such, the input seeds may be supplied to server 132 (and list scorer 220) based on the user's interactions with the social networking service. For example, the supplied input seeds may be one or more different users that the user has chosen to follow in the social networking service. Accordingly, list scorer 220 may be configured to suggest to the user (e.g., via the graphical user interface) other related users the user may wish to follow given the supplied set of input seed users.

As described above, the lists identified by list identifier 210 include lists of users of social networking service or site, as described above. In an example, list scorer 220 is configured to identify entities (e.g., users of a social networking service) that co-occur in the lists (e.g., social circles or groups) identified by list identifier 210 exceeding a threshold co-occurrence value, as described above. In an example, list scorer 220 searches for related entities in only those lists having at least one seed. Further, list scorer 220 scores each list based on relevant attributes of the list and its entities/ items. As will be described in further detail below, list scorer 220 may assign probabilistic weights to each list indicating the relative likelihood that the list includes list items that are related to the input seed items.

In an example, list scorer 220 creates a probabilistic model to rank each list based on its relevancy with respect to finding related entities given the input seed entities. For example, list scorer 220 may determine the probability of each of the lists being ranked by performing one or more iterations of an expectation maximization technique on a Naive Bayes model. The leaf node for such a model may be, for example, the individual list entities/items and the class node is binary. As will be described in further detail below, "positive" and "negative" class conditional distributions may be calculated based on a background probability associated with each list entity that is not a seed. For example, the "background probability" of an entity in a list may refer to the probability or likelihood that the entity would appear in any list regardless of the seeds (e.g., number of lists in which an entity appears relative to the total number of lists). Alternatively, the background probability for an entity may instead refer to the likelihood of appearing as a particular element of a list (e.g., number of times the entity appears as a list element relative to the total number of elements or entities in one or more subsets of all lists). Further, a constant may be used for the background probability in combination with either of the two aforementioned quantities (i.e., either the likelihood of appearing in any list or the likelihood of appearing as a particular element).

For example, a set of lists may include three lists—List 1: {A, B, C}; List 2: {A}; and List 3: {B}. In this example, the background probability for the entity A, under the first definition (i.e., likelihood that the entity would appear in any list), may be equivalent to approximately 66.7%, based on the following calculation:

$$\text{background probability of } A = \frac{\langle \text{number of lists in which } A \text{ appears} \rangle}{\langle \text{total number of lists} \rangle} = \frac{2}{3}.$$

Alternatively, the background probability for the entity A, under the second definition (i.e., likelihood of appearing as a particular element) may be equivalent to 40%, calculated as follows:

$$\text{background probability of } A = \frac{\langle\text{number of times } A \text{ appears as a list element}\rangle}{\langle\text{total number of lists elements}\rangle} = \frac{2}{5}.$$

The background probability of an entity in a social networking context may be considered a measure of the entity's popularity relative to other entities. For example, the entity may be a celebrity who has thousands of followers. Consequently, this celebrity may co-occur in various lists with 30% or more of the seeds, even though the celebrity may not have any independent relation to any of the seed entities, for example, based on some independent criteria or social connection (e.g., being family members or relatives). As such, list scorer 220 may be configured to modify a score, for example, by assigning a lower score to an entity (or a list including the entity) that is generally more popular in comparison to another entity. This comparison may be made by list scorer 220, for example, when both entities co-occur with seed items identically. For example, the background probabilities for each item in a list may be computed by list scorer 220 or may be a pre-computed by either list scorer 220 or some other component (not shown) of server 132 or computing system 130. In an example, any pre-computed background probabilities may be stored in database 134 or another data storage device accessible to data server 132.

In operation, list scorer 220 initially may assign each seed entity a default probability. For example, the default probability for each seed may be calculated based on the following equation:

$$P(\text{seed}|C1) = K/N \quad (1)$$

where K refers to some predetermined constant value (e.g., between 0 and 1) and N refers to the total number of supplied seeds.

Prior to scoring each list, list scorer 220 may initially filter out any lists that do not have at least one seed, as noted previously. Thus, list scorer 220 may score only a subset of the lists identified by list identifier 210. In an example, to improve efficiency, list scorer 220 may first assign a preliminary score or "pre-score" to each list based on its length and number of seeds. For example, the lists may be filtered by first ranking the lists based on the assigned scores. Lists having a greater number of seeds may be assigned a higher score or ranking. Further, lists having a shorter length (e.g., relatively fewer number of total entities) also may be assigned a higher rank. The assigned pre-scores may then be used to filter out lists based on some predetermined threshold value for the pre-score for further analysis and scoring for finding entities related to the seed entities. For example, any list having a pre-score that falls below the predetermined threshold may be considered to be less relevant, and thus, excluded from further analysis. To further improve the quality of results, small differences in list length may be ignored by quantizing the list length when computing the rank or pre-score. For example, the list length may be rounded up to the next multiple of some predetermined numeric value (e.g., between 1 and 1000) representing, for example, an average or default number of items in a list before ranking or assigning the pre-score to the list. For example, the pre-score for a list entity may be calculated by list scorer 220 based on the following equation:

$$\text{prescore(List)} = \frac{\min(M, \text{NumSeeds\_in\_List})^N}{\text{quantized\_length(List)}} \quad (2)$$

where M refers to a predetermined value for the multiple to be used for rounding list length, as described above, where NumSeeds_in_List refers to the total number of seed entities in the list, where N refers to the total number of lists, and where quantized_length(List) refers to the quantized or rounded length of the list, as described above. This may help to increase the variety of the lists processed or scored by list scorer 220, for example, by precluding situations where only the shortest lists from a set including millions of matching lists are scored. However, whether to perform such quantization may be determined so as to achieve a balance between quality of results and the potential performance impacts due to the additional operations that must be performed.

In an example, list scorer 220 calculates a score for each list including at least one seed entity (e.g., each list in the set of filtered lists). Similar to the pre-scoring operation for filtering lists, as described above, list scorer 220 scores each of the filtered lists based on various parameters associated with the list and list entities. Examples of such parameters include, but are not limited to, the total number of seeds in the list, the length of the list (e.g., total number of list entities), and relative popularity of each entity in the list, e.g., based on the entity's background probability. In scoring each list, list scorer 220 generally gives greater priority to lists having a shorter length and relatively more seeds, as described above.

In an example, list scorer 220 ranks each list based on the number of seeds in the list and the length of the list. For example, a list having a relatively greater number of input seed entities may be considered more useful, since the other entities in the list may be more likely to be related to the seed entities than another list having relatively few number of seeds. Further, longer lists having a relatively greater number of entities may be considered to be less useful and thus, may be given a lower score since the entities in the list may be statistically less likely to be related to each other. Thus, for example, list scorer 220 may assign a higher score to a relatively short list including a number of seeds than a longer list including the same or fewer number of seeds.

In an example, list scorer 220 calculates a score for each list based on positive and negative components of the conditional probability model. For example, the positive and negative components of a list score may be based on the background probabilities associated with each of the list entities, as described above. For example, list scorer 220 may create a probabilistic model in which an initial "positive" class conditional distribution $P(X|C1)$ is calculated for each candidate entity X in a list being ranked. The "negative" class condition distribution $P(X|C0)$ for each list entity X simply may be the background probability associated with the particular list entity.

In an example, list scorer 220 may define the positive class conditional distribution $P(X|C1)$ to have greater weight to seed entities (e.g., using equation (1), above), while using some function of the background probabilities for all other entities. For example, list scorer 220 may score each list by first calculating the positive component of the list score based on the following equation:

$$\text{positive\_score} = \log P(C1) + \text{Sum\_}\{X \text{ in list}\} \log P(X|C1) \quad (3)$$

where P(C1) is a constant prior probability, Sum_{X in list} P(X|C1) represents the total sum of the positive class conditional probabilities of all elements X in the list, and P(X|C1) represents the positive class conditional probability of an element X, as defined above. For non-seed elements, the value of P(X|C1) may be equivalent, for example, to some function (F) of the background probability of X. For example F(background probability of X) may be represented as follows:

$$F(\text{background probability of } X) = (\text{background probability of } X + \text{epsilon})^{\wedge}\text{gamma}$$

where epsilon and gamma are predetermined constants. To further discount relatively longer lists, list scorer 220 may modify, e.g., increase, the probability of a list entity that is not a seed by some predetermined factor alpha as follows:

$$P(X|C1) = \text{alpha} \times F(\text{background probability of } X) \quad (4)$$

where the value of alpha determines the amount discount to apply to the entities from longer lists. For example, decreasing the value of alpha has the effect of increasing the amount of discount applied to the list entities in question. Thus, adjusting the value of alpha allows list scorer 220 to bias against popular entities, e.g., celebrities, as described above. In an example, a default value of alpha may be set to some predetermined number between 0 and 1. In a further example, list scorer 220 may adaptively change the value of alpha towards 1.0 if, for example, all the seeds are determined to be "popular." For example, an additional "popularity" factor may be introduced for this purpose, as represented by the following equation for adaptively calculating alpha:

$$\text{alpha} = \text{alpha} \times [(1 - \text{popularity\_factor}) \times \text{alpha} + \text{popularity\_factor}] \quad (5)$$

where alpha is some predetermined factor, as described above, and popularity_factor is an amount representing the relative degree of celebrity status or popularity of an entity, as described above. For example, the value of this popularity_factor may tend towards a value of '0' if, for example, any of the seeds are rare, or towards a value of '1' if, for example, all of the seeds are determined to be extremely popular. The degree of relative popularity between different entities in one or more lists may be based on, for example, some predetermined threshold value, where values above such threshold are considered popular and the degree of popularity may be determined based on the extent this value exceeds the threshold.

List scorer 220 may calculate the negative component of the entity's score as follows:

$$\text{negative\_score} = \log(1 - P(C1)) + \text{Sum\_}\{X \text{ in list}\} \log(\text{background probability of } X) \quad (6)$$

The positive and negative scores can then be used to determine the total score for the list, as represented by:

$$P(C1 | \text{list}) = 1 - \frac{1}{(e^{\wedge}(\text{positive\_score} - \text{negative\_score}) + 1)} \quad (7)$$

In an example, once the conditional probability scores for each of the lists are calculated, as described above, list scorer 220 assigns the respective list score to each of the entities in the list. List scorer 220 may then sum of all the list scores for each list entity to arrive at a final score for each entity based on the probability model associated with the list. In a further example, list scorer 220 may use another weight factor beta to modify, e.g., increase, the weight assigned to particular lists. The calculation of entity scores for each list entity may be expressed as follows:

$$\text{Score}(X) = \text{Sum\_}\{\text{lists that contain candidate}\}(\text{beta} \times P(C1|\text{list})) \quad (8)$$

where the value of beta may be used to modify the weight assigned to the list, as noted above. In an example, when scoring an entity included within a list, list scorer 220 may increase the weight of the entity if multiple input seeds are present in the list. For example, the value of beta may be set to some multiple of the total number of seeds in the list (e.g., the squared value of the total number of seeds in the list) so as to weigh lists with many seeds even more heavily than the probabilistic model usually would.

In a further example, list scorer 220 iterates the above algorithm for each candidate X, where a new P(X|C1) distribution may be generated from normalizing the scores for the top N candidates, where N is some predefined number.

List scorer 220 then sorts the entities in each list by, for example, dividing the original score for each entity X, e.g., calculated in equation (8) above, with the background probability associated with the candidate entity. For example, this may be represented as follows:

$$\text{Final\_Score}(X) = \text{Score}(X)/\text{background probability}(X) \quad (9)$$

where Final_Score(X) represents the new or final score for an entity based on its previous score, as represented by Score(X).

As described above with respect to example social graph 300 of FIG. 3, certain lists may be associated with social circles or groups that are created or owned by a user of a social networking service or site. For example, a first user may be following a second user in the social networking service. Further, the second user may in turn be following the first user. In an example, list scorer 220 modifies, e.g., assigns higher, list scores based on such reciprocated links between one or more entities in the list, as such reciprocal links may indicate a stronger relationship between these entities. For example, list scorer 220 may identify such reciprocal relationships between entities within a single list (or social circle) or across different lists/circles based on social graph data 240, as described above. Accordingly, list scorer 220 may be configured to modify list scores or weights based on the identified reciprocal relationships, for example, by assigning relatively greater weight (e.g., a relatively higher score), to lists having entities that have reciprocal connections between one another or connections to the owner of the list. For example, a score for a first list that is owned by a first user of a social networking service may include a second user. List scorer 220 may modify a score (e.g., assign a higher score) for the second user in the first list if it is determined, e.g., based on edges representing social connections in a social graph, that there is a second list owned by this second user including the first user, e.g., such that the first and second users are determined to be following one another.

In an example, list scorer 220 accounts for reciprocated links between entities of a social networking service (e.g., where one user in a social circle or group also follows the owner of the circle) by modifying the positive and negative scores (e.g., as previously calculated based on equations (3) and (6) above) for a given list, respectively, as follows:

$$\text{positive\_score} = \log P(C1) + \text{Sum\_}\{X \text{ in list and list-owner not in } X\text{'s list}\} \log P(X|C1)$$

negative_score=log(1−P(C1))+Sum_{X in list and list-owner not in X's list} log(background probability of X)

In addition to reciprocity, list scorer 220 may adjust these scores based on other similar characteristics between different entities in a list, or between such an entity and the owner of the list. Examples of such characteristics may include, but are not limited to, users of a social networking site having the same last name or users whose profiles may indicate participation in the activities with one another (e.g., phone calls or chat sessions that may be offered as specialized services of the social networking site) or users who share content with each other (e.g., media files, e.g., digital pictures or video, via an interface of the social networking site).

In an example, list scorer 220 uses various sub-list popularity metrics to detect non-independent data within the different lists identified by list identifier 210. For example, portions of a list (or sub-list) may have been generated by one user, or other source, and then copied by many other users. Consequently, no meaningful relationship may actually exist between the entities of such a sub-list. However, an undesired consequence of using naive scoring techniques (e.g., based on a Naïve Bayes probabilistic model, as described above) is that co-occurrences of entities in these sub-lists would potentially be counted too many times, thereby skewing the popularity index (i.e., the entity scores and background popularity). Accordingly, list scorer 220 may be configured to detect such sub-lists and modify, e.g., reduce, the scores or assign lower weight to entities found in any list containing sub-lists that have been copied many times.

In some implementations, list scorer 220 may be configured to merge multiple lists together. For example, lists may be merged based on ownership. Thus, lists belonging to a user may be merged. In an example, a user of a social networking service or site may own two separate lists or social circles, one for close friends and one for acquaintances. Further, the user may not wish for the members of each list (i.e., other users of the social networking service) to know which list a particular member may belong. Accordingly, list scorer 220 may merge such lists together prior to scoring in order to reduce the likelihood of any unintended disclosure of an individual's membership or inclusion in a particular circle, which may implicitly identify personal characteristics of the individual (e.g., based on public characteristics associated with the social circle as a whole).

In an example, list scorer 220 may include an operating mode in which circle boundaries are ignored, for example, to protect the information privacy related to a user's membership or inclusion in a particular circle. In a further example, list scorer 220 may include an operational mode in which circle boundaries are used, for example, to improve the quality of identification of related entities in the lists given a set of input seed entities, as described above. For example, the recognition of separate circles (e.g., accounting for circle boundaries) may allow for a better, more precise identification of the most relevant or strongest relationships between members of the circles (e.g., as defined by circle memberships and associated attributes). In yet another example, list scorer 220 may use a combination of scores including scores from lists that respect circle boundaries and scores from lists formed by merging a user's circles.

List scorer 220 may further combine additional metrics related to the entities of a list for purpose of scoring lists and list entities. For example, when suggesting related users, list scorer 220 may assign a higher weight or score to those users in an online discussion forum or other content stream who post more frequently than others. Further, higher scores may be assigned to users whose posts have been determined (e.g., by other users) to be relatively more interesting than those of others in the online forum or content stream. In this example, the level of interest associated with an item posted by a user may be determined based on the number of positive comments or endorsements the posted item may have received from other users. For example, if two users who are both members of the same social circle post content to a forum, higher scores may be assigned to the user members determined to have posted higher quality content within some relevant time frame.

List processor 230 may include logic that processes the lists generated by list scorer 220 and outputs lists to client 110. For example, list processor 230 may order items in a list and possibly format the list for presentation to a client device (e.g., any of clients 110*a-c* of FIG. 1, as described above). It may then be determined whether another iteration of the above processing should be performed. When a sufficient number of iterations have been performed, a new list may be formed including entities determined to be related to the seed entities. Such related entities may be identified as those entities having relative probability scores exceeding a threshold, e.g., the highest relative probability scores, as assigned by list scorer 220. For example, list processor 230 may identify entities based on total scores above some predetermined threshold probability or based on some predetermined number of entities determined to have the highest total score or probability. Further, such probability may be based on the conditional distribution of weights or probabilities, as described above, or some other desired criteria related to a group of entities. List processor 230 may also filter out any entities that either do not appear in a sufficient number (e.g., based on some predetermined threshold) of lists including at least one of the seeds. In addition, list processor 230 may filter out any entities for which an insufficient number (e.g., also based on some predetermined threshold) of users have added both the entity and at least one seed to one of their lists.

List processor 230 may then present the related entities to the client device of the user, e.g., via a graphical user interface displayed at the device, as described above. In an example, the related entities are provided to the user as suggestions related to one or more other users in the social networking site or service, with whom the current user has already selected to establish a social connection or follow via the social networking site. In a different example, new user suggestions for the current user may be generated based on similarities between the user's profile and that of other users of the social networking site. Examples of types of information associated with the user's profile that may be similar to that of other users include, but are not limited to, workplace and relevant dates, school or education information and relevant dates, current and prior locations of residence and dates there, hometown and age, similar interests or hobbies and same name(s) (e.g., same last name).

For example, these suggestions may be displayed at the user's device (e.g., client 110*a* of FIG. 1, a described above) as a selectable list of entities or user profiles. Selection of one of the entities in the displayed list may, for example, cause the user's device (e.g., client 110*a* of FIG. 1) to send a notification to a client device (e.g., client 110*b* of FIG. 1) of the selected user (e.g., user 115*b* of FIG. 1) via a network (e.g., network 120 of FIG. 1). Such notification may indicate that the first user (e.g., user 115*a* of FIG. 1) would like to follow the selected user (e.g., user 115*b*) or include such other user in a social circle. Further, the notification may further request approval from this second user (e.g., user 115b) to allow the first user (e.g., user 115a) to follow or add the second user to the social circle so as to enable information to be shared between the two users.

Figure 4:
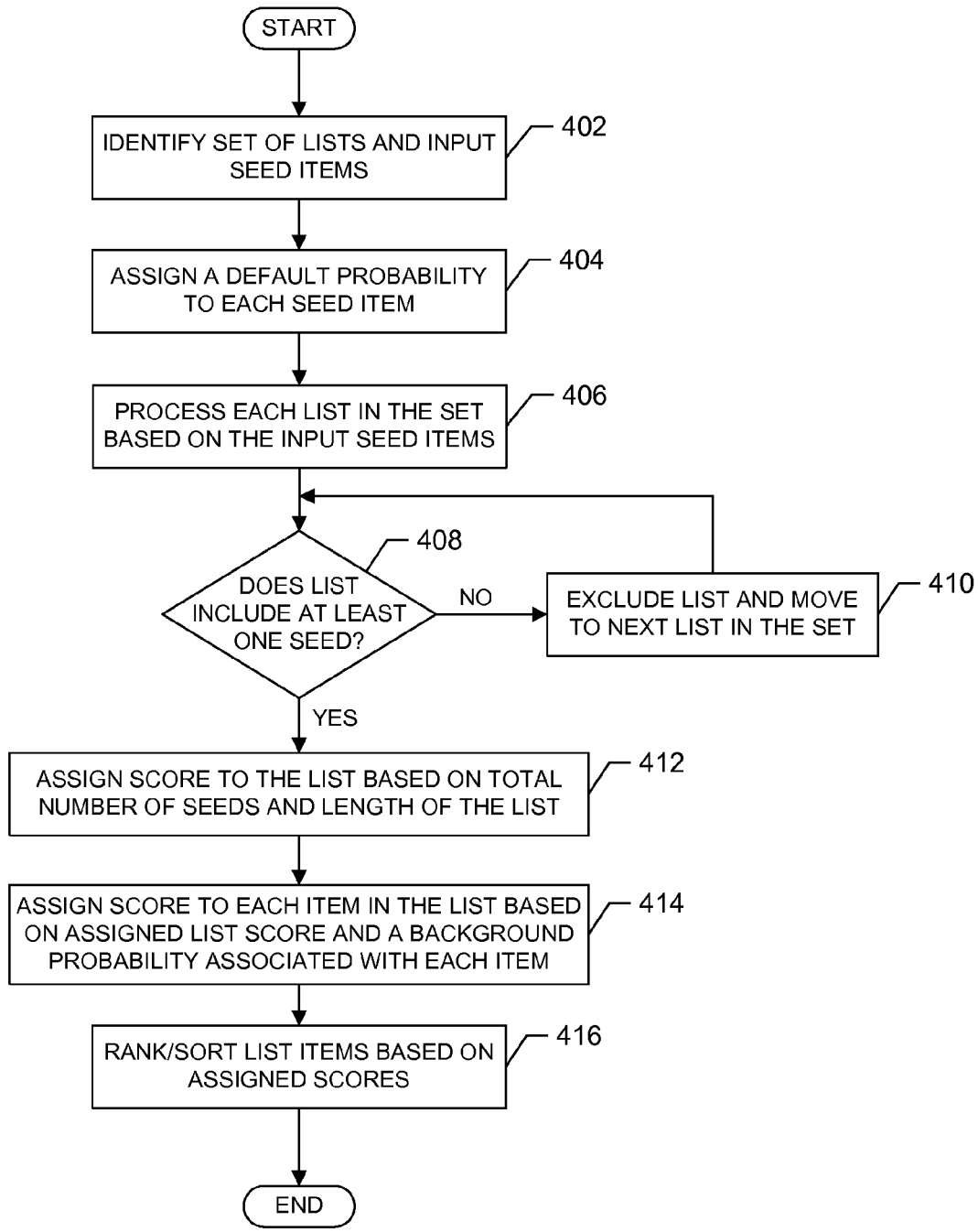
FIG. 4 is a flowchart of an example process for identifying related entities for a given set of initial entities.

FIG. 4 is a flowchart of an example process 400 for identifying related entities for a given set of initial entities. For ease of explanation, process 400 will be described using network environment 100 of FIG. 1 and computing system 130 of FIG. 2, including list identifier 210, list scorer 220 and list processor 230, as described above. However, it should be noted that process 400 is not intended to be limited thereto.

As shown in FIG. 4, process 400 begins in step 402, which includes identifying a set of lists and input seed items or entities associated with such lists. For example, such lists may correspond to lists of users of a social networking service, as described above. Further, the lists may be identified based on, for example, publicly declared social connections between the different users. Such connections may be represented as edges of a social graph data structure (e.g., social graph 300 of FIG. 3, as described above). Further, these connections may be formed based on explicit declarations by such users as well as implicit relationships based on interactions between users on a public web page or forum, as described above. Step 402 may be performed by, for example, list identifier 210 of server 132 of FIG. 2, as described above.

Process 400 then proceeds to step 404, in which a default probability is assigned to each seed item or entity in each of the identified lists, as described previously. For example, such a probability may be an initial probability to be used as part of a probabilistic model for determining items in the lists that are related to the seed items. Such a probabilistic model may be based on, for example and without limitation, expectation maximization techniques for a Naïve Bayes model. In step 406, each list that was identified in step 402 is processed based on the input seed items, as will be described below with respect to steps 408, 410, 412, 414 and 416 of process 400.

In processing each list, it may be determined in step 408 whether the particular list includes at least one seed item. In an example, to improve efficiency, only those lists including at least one seed item may be processed. Thus, a list not including any seeds is excluded and the next list in the identified set of lists is processed (step 410). If the list being processed includes at least one seed, a score is assigned to the list in step 412, based on various parameters including, for example, the total number of seeds in the list and the length of the list (i.e., total number of entities in the list). For example, the assigned score may be weighted in order to give greater preference or priority to certain lists based on its parameters. For example, longer lists having a relatively large number of entities or items may be given less priority and a lower score. This is because items in longer lists are generally less likely to be related to each other. Further, a list having a relatively greater number of input seeds may be indicate that the other items in the list are related to these input seeds, which is the desired outcome in this example. Accordingly, such lists may be given higher priority, and thus, assigned a relatively higher score.

Once the lists are scored, the score for each list is applied to the respective list items in step 414. For example, the assigned score for a list item may be based on the score of the list in which the item is included and a background probability associated with the item. As described previously, the background probability of the list item may be the probability or likelihood that the item would appear in any list regardless of the seeds. Accordingly, the background probability of an entity (e.g., individual user) in a social networking context may be considered a measure of the entity's popularity relative to other entities. An example of a popular user may be a celebrity having a multitude of followers and thus, co-occur with a large percentage of the seeds in some of the same lists, even though the celebrity may not be actually related to any of the seed entities. In order to account for this discrepancy, the score assigned to an entity may be adjusted (e.g., by adjusting the positive and/or negative components of the score, as described above) to reflect that the entity is generally more popular in comparison to one or more other entities, for example, when these entities co-occur with seed items in an identical fashion.

Once the items in each of the lists are scored, process 400 proceeds to step 416, in which the list items are ranked based on the assigned scores. In an example, the items ranked at the top of the list may represent the items that are determined to be related to the seed items. Further, one or more iterations of the steps of process 400 may be performed such that a new list may be formed including list items determined to be related to the given input seeds. Such related items may be identified as those items having, for example, the highest relative probability scores, as described above. Steps 404, 406, 408, 410, 412, 414 and 416 may be performed by, for example, list scorer 220 of FIG. 2, as described above.

Figure 5:
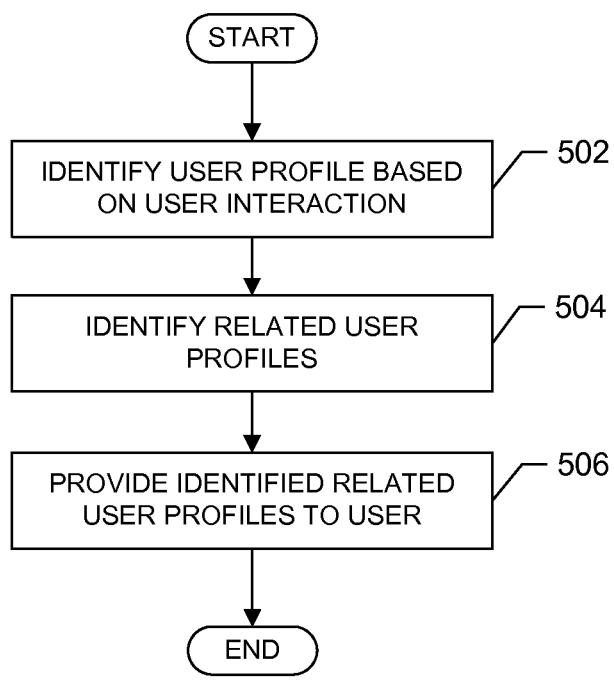
FIG. 5 is a flowchart of an example process for identifying related user profiles given an initial user profile.

FIG. 5 is a flowchart of an example process 500 for identifying related user profiles given an initial user profile. For ease of explanation, process 500 will be described using network environment 100 of FIG. 1 and computing system 130 of FIG. 2, including list identifier 210, list scorer 220 and list processor 230, as described above. However, it should be noted that process 500 is not intended to be limited thereto.

Process 500 begins in step 502, in which one or more user profiles are identified based on interaction from a user. In an example, the user profile is associated with a social networking service or site. For example, such interaction may be in the form of user input related to various control elements of a graphical user interface displayed at the user's device by the social networking service or site. However, process 500 is not intended to be limited to social networking services or sites. In a different example, one or more input profiles of entities may be inferred based on the user's prior interactions with other entities. For example, such prior interactions may be associated with some predetermined number of other users via an interface provided by a social networking service or other online user discussion forum or content stream, as described previously. Step 502 may be performed by, for example, list identifier 210 of FIG. 2, as described above.

In the example shown in FIG. 5, related user profiles are identified in step 504 based on the initial user profile identified in step 502. For example, the related user profiles may be determined based on social graph data (e.g., social graph data 240 of FIG. 2, as described above) associated with a social networking site. As described above, the initial user profile may represent the input seed entity for public lists or social circles of different users in the social networking site. For example, the social graph may be analyzed to determine the explicit and implicit social connections between the user profile and other user profiles already associated or affiliated with the input user profile.

In a further example, related user profiles may be identified based on other similarities between the user profile and other user profiles in the social networking site including, but not limited to, workplace and dates there, school or education and dates there, current and prior residence locations and corresponding dates, hometown and age, hobbies and interests and same last name. Step 504 may be performed by, for example, list scorer 220 of FIG. 2, as described above. The user profiles determined to be related to the initial or input user profile are provided to the user in step 506. Step 506 may be performed by, for example, list processor 230 of FIG. 2, as described above.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
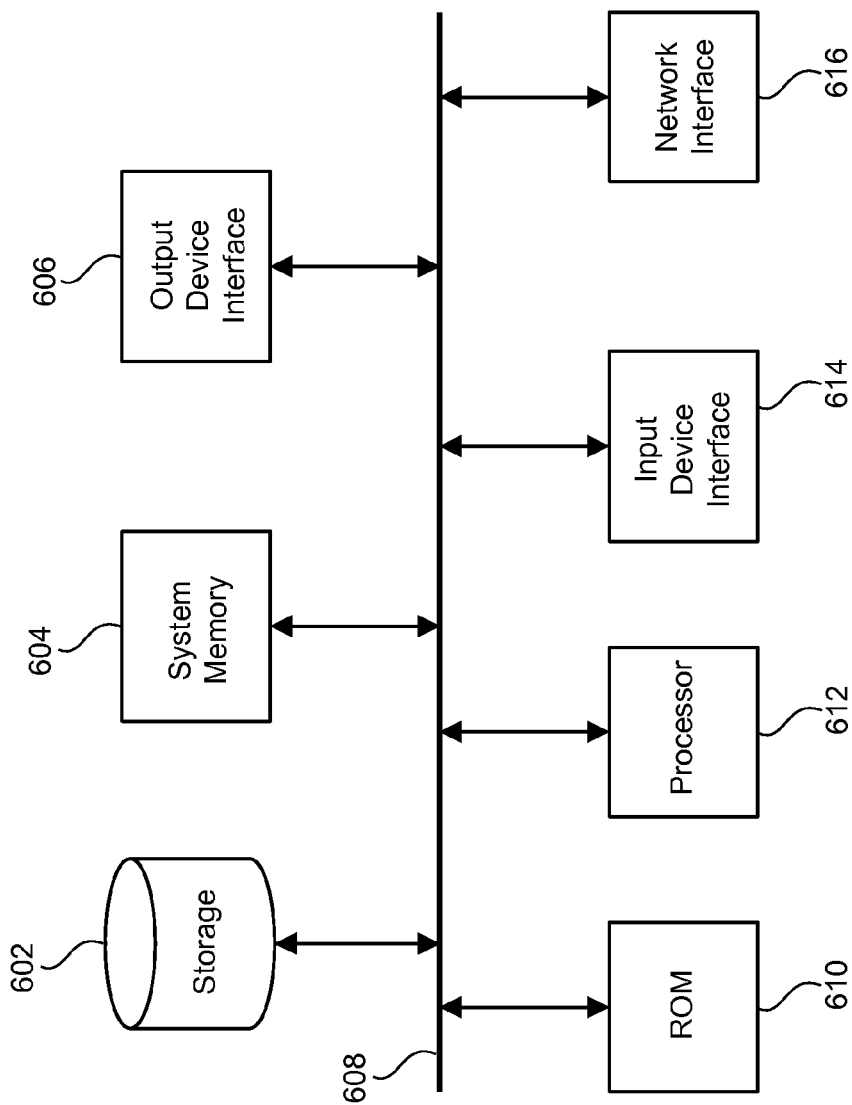
FIG. 6 conceptually illustrates an example electronic system in which some of the subject technology may be implemented.

FIG. 6 conceptually illustrates an example electronic system with which some implementations of the subject technology are implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for automatically identifying related items/entities from different lists given one or more seed items, in accordance with an implementation of the subject technology disclosed herein. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, e.g., cathode ray tubes (CRT) or liquid crystal displays (LCD). Some implementations include devices, e.g., a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, e.g., the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, e.g., microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code produced by, for example, a compiler and files including higher-level code that are executed by a computer, an electronic component, or a microprocessor using an interpreter.

While the above discussion primarily refers to microprocessor or multi-core processors that execute software, some implementations are performed by one or more integrated circuits, e.g., application specific integrated circuits (ASICs) or field programmable gate arrays (FPGAs). In some implementations, such integrated circuits execute instructions that are stored on the circuit itself.

As used in this specification of this application, the terms "computer", "server", "processor", and "memory" all refer to electronic or other technological devices. These terms exclude people or groups of people. For the purposes of the specification, the terms display or displaying means displaying on an electronic device. As used in this specification of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 7:
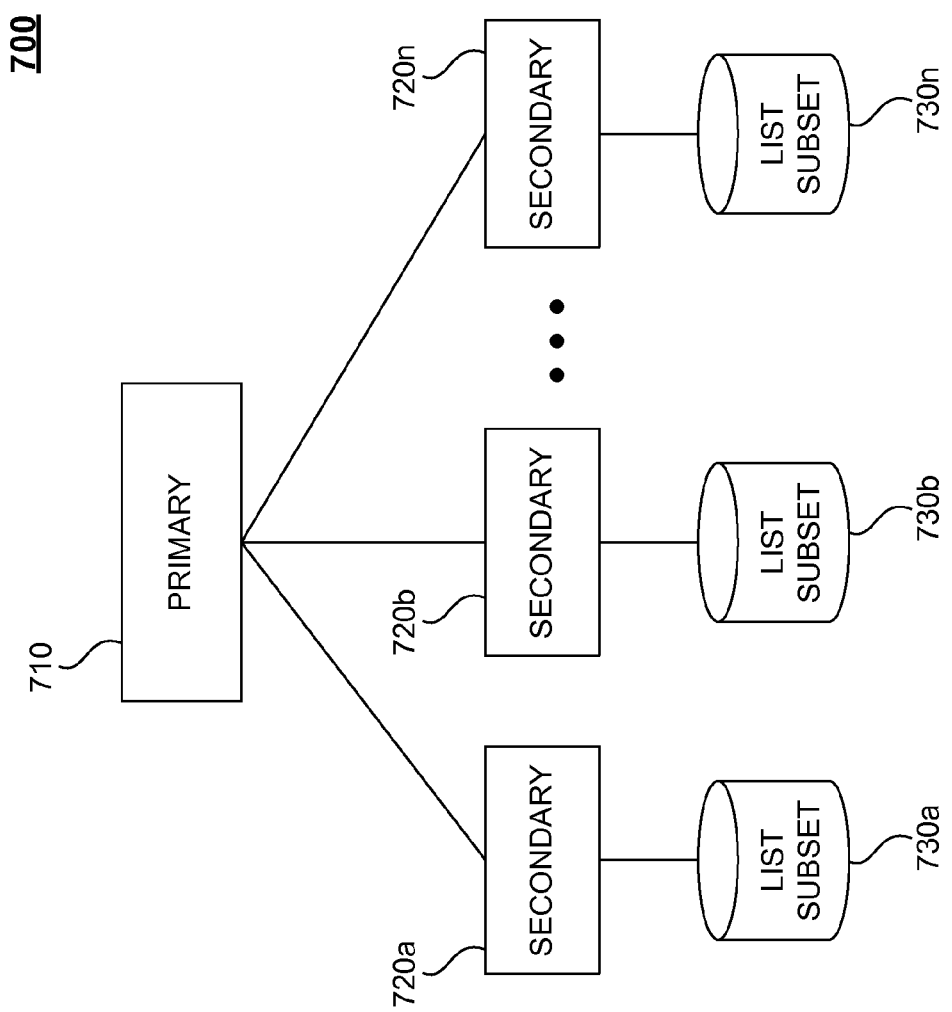
FIG. 7 is a diagram of an example computing system for implementing some of the subject technology as described herein.

Further, the computing system may include multiple computing and storage devices arranged in a clustered computing environment, as shown in the example system of FIG. 7. FIG. 7 is a diagram of an example clustered computing system 700 suitable for implementing at least a portion of the subject technology as described herein. System 700 includes a computing device 710 that is designated as a primary node in the clustered environment and multiple computing devices 720a-n, which are designated as secondary nodes. However, in some other implementations, any of devices 720a-n may be designated as the primary node while device 710 is designated as a secondary node. For example, primary device 710 and each of secondary devices 720a-n may be implemented using electronic system 600 of FIG. 6, as described above.

Each of secondary devices 720a-n may be responsible for a subset of the total existing set of lists. For example, as shown in FIG. 7, the different list subsets that are processed by each of secondary devices 720a-n may be stored in data storage devices 730a-n communicatively coupled to secondary devices 720a-n. For example, each of data storage devices 730a-n may be any type of computer readable storage medium for storing data or instructions for execution by a processor. Although devices 730a-n are shown as separate devices from secondary devices 720a-n, it should be noted that storage devices 730a-n may be integrated with their respective slave devices 720a-n. For example, each of storage devices 730a-n may be implemented using data storage 602 of system 600 of FIG. 6, as described above.

In operation, primary device 710 may be configured to generate an initial set of probabilistic models (e.g., each of which may be based on the Naïve Bayes model, as described above). Primary device 710 may then distribute the generated models to secondary devices 720a-n for computing entity scores, as described above, for each of their respective subset of lists, e.g., as stored in storage devices 730a-n. For example, secondary devices 720a-n may compute intermediate entity scores based on their respective lists. These intermediate entity scores may then be sent from each of secondary devices 720a-n to primary device 710. Primary device 710 may then combine the intermediate entity scores received from secondary devices 720a-n to produce the final entity scores. This process may repeat for a predetermined number of iterations, as described above.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Any reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method comprising:
   identifying connections between an entity and at least one or more seed entities from at least one data source, the one or more seed entities received from a device of a user;
   generating a set of lists based on the identified connections, each list in the set including one or more entities;
   determining a background probability for each entity in the set of lists, the background probability indicating a frequency that each entity appears in the set of lists;
   calculating a list score for each list in the set of lists based on a number of seed entities in each list of the set and the determined background probabilities associated with the one or more entities in each list;
   identifying a subset of lists from the set of lists based on the calculated list scores;
   assigning the calculated list score to the respective one or more entities in each list of the identified subset based on the background probabilities associated with the one or more entities;
   ranking the one or more entities in each list of the subset based on the assigned lists scores, so as to identify entities related to the one or more seed entities; and
   transmitting at least a portion of the ranked one or more entities from the subset of lists to the user's device.

2. The method of claim 1, wherein the determining of the background probability for each entity comprises:
   determining a number of lists in which each of the one or more entities appears in the set of lists; and
   calculating the background probability for each of the one or more entities based on the determined number of lists relative to a total number of lists in the set of lists.

3. The method of claim 1, wherein the determining of the background probability for each entity comprises:
   determining a number of occurrences of each of the one or more entities as an element in a list from the set of lists; and
   calculating the background probability for each of the one or more entities based on the determined number of occurrences relative to a total number of elements in all lists in the set of lists.

4. The method of claim 1, wherein the background probability is a predetermined constant value.

5. The method of claim 1, wherein the entities, including the one or more seed entities, in the set of lists are users of a social networking service and each list in the set of lists corresponds to a social group including a subset of the users of the social networking service.

6. The method of claim 5, wherein the identifying the set of lists comprises:
   identifying explicit social connections between the users of the social networking service based on a social graph associated with the social networking service; and
   generating the set of lists based on the identified social connections.

7. The method of claim 5, wherein the one or more seed entities are specified by a user of the social networking service, prior to the identification of the set of lists, wherein the user is an owner of at least one list including the one or more seed entities from the set of lists.

8. The method of claim 5, wherein the identifying the set of lists comprises:
   identifying implicit connections between a user of the social networking service and at least one of the seed entities based on the user's interactions with a content item associated with the seed entity, the content item being accessible to the seed entity and at least the user via an interface of the social networking service.

9. The method of claim 8, wherein the calculating the list score further comprises:
   calculating the list score for each list in the set of lists based on quality metrics for the content item associated with the seed entity.

10. The method of claim 9, wherein the quality metrics represent a level of interest for the content item, and the level of interest is indicated by other users of the social networking service via the interface of the social networking service.

11. The method of claim 1, wherein the calculating the list score further comprises:
   generating a probabilistic model for the one or more entities in each list in the set, based on the one or more seed entities.

12. The method of claim 11, wherein the calculating the list score further comprises:
   calculating a positive class component of the list score for each list in the set of lists based on the generated probabilistic model;
   calculating a negative class component of the list score for each list in the set of lists based on the generated probabilistic model and the background probabilities associated with the one or more entities in each list; and computing the list score for each list in the set of lists based on the calculated positive and negative class components of the list score.

13. The method of claim 12, wherein each list in the set of lists has a list owner, the method further comprising:

determining whether reciprocal connections exist between each of the one or more entities and a respective list owner for each list in the set of lists;

adjusting the positive or negative class components of the list score for each list based on the determination, so as to give relatively greater weight to lists including at least one entity having a reciprocated link; and updating the computed list score for each list based on the adjusted positive and negative class components.

14. The method of claim 13, further comprising:

identifying two or more lists in the set of lists for which the list owner is identical; and merging the identified two or more lists into a single list for the set of lists.

15. The method of claim 12, further comprising:

determining whether non-independent data is included for each list in the set of lists based on popularity metrics associated with at least a portion of each list;

adjusting the positive or negative class components of the list score for each list based on the determination, so as to give relatively lower weight to lists including non-independent data; and updating the computed list score for each list based on the adjusted positive and negative class components.

16. The method of claim 12, further comprising:

determining a popularity factor for each of the one or more entities in each list in the set of lists;

adjusting the positive or negative class components of the list score for each list based on the determined popularity factor of the one or more entities, so as to assign relatively lower weight to lists including at least one entity having a relatively high popularity factor; and updating the computed list score for each list based on the adjusted positive and negative class components.

17. The method of claim 1, further comprising:

filtering the identified set of lists to include one or more lists having at least one seed entity, wherein the calculating, identifying, assigning and ranking steps are performed only for the one or more lists in the filtered set of lists.

18. The method of claim 17, wherein the filtering further comprises:

computing a preliminary list score for each list in the filtered set of lists based on a number of seed entities in each list in relation to a length of each list, the length representing a total number of entities in each list; and filtering the lists in the set based on the computed preliminary list score of each of the lists.

19. The method of claim 18, wherein the computing the preliminary list score comprises:

quantizing the length of each list based on the total number of entities in the list; and computing the preliminary list score for each list in the filtered set of lists based on the number of seed entities in each list in relation to the quantized length of each list.

20. The method of claim 18, further comprising:

modifying the computed preliminary list score for each list in the filtered set of lists that includes two or more seed entities, so as to assign relatively greater weight to lists including at least two or more seed entities.

21. A system for identifying related list entities, the system comprising:

a memory comprising:

a list identifier configured to provide instructions to:

identify connections between an entity and at least one or more seed entities from at least one data source, the one or more seed entities received from a device of a user, and generate a set of lists based on the identified connections, each list in the set including one or more entities;

a list scorer configured to provide instructions to:

determine a background probability for each entity in the set of lists, the background probability indicating a frequency that each entity appears in the set of lists, calculate a list score for each list in the set of lists based on a number of seed entities in each list of the set and the determined background probabilities associated with the one or more entities in each list, identify a subset of lists from the set of lists based on the calculated list scores, assign the calculated list score to the respective one or more entities in each list of the identified subset based on the background probabilities associated with the one or more entities, and rank the one or more entities in each list of the subset based on the assigned lists scores, so as to identify entities related to the one or more seed entities; and a list processor configured to provide instructions to transmit at least a portion of the ranked one or more entities from the subset of lists to the user's device; and a processor configured to execute instructions provided by the list identifier, the list scorer, and the list processor.

22. The system of claim 21, wherein the list scorer is further configured to provide instructions to determine a number of lists in which each of the one or more entities appears in the set of lists, and to calculate the background probability for each of the one or more entities based on the determined number of lists relative to a total number of lists in the set of lists.

23. The system of claim 21, wherein the list scorer is further configured to provide instructions to determine a number of occurrences of each of the one or more entities as an element in a list from the set of lists, and to calculate the background probability for each of the one or more entities based on the determined number of occurrences relative to a total number of elements in all lists in the set of lists.

24. The system of claim 21, wherein the background probability is a predetermined constant value.

25. The system of claim 21, wherein the entities, including the one or more seed entities, in the set of lists are users of a social networking service and each list in the set of lists corresponds to a social group including a subset of the users of the social networking service.

26. The system of claim 25, wherein the list identifier is further configured to provide instructions to identify explicit social connections between the users of the social networking service based on a social graph associated with the social networking service, and to generate the set of lists based on the identified social connections.

27. The system of claim 25, wherein the list identifier is further configured to provide instructions to identify implicit connections between a user of the social networking service and at least one of the seed entities based on the user's interactions with a content item associated with the seed entity, the content item being accessible to at least the seed entity via an interface of the social networking service.

28. The system of claim 21, wherein the list scorer is further configured to provide instructions to generate a probabilistic model for the one or more entities in each list in the set, based on the one or more seed entities.

29. The system of claim 28, wherein the list scorer is further configured to provide instructions to:
  calculate a positive class component of the list score for each list in the set of lists based on the generated probabilistic model;
  calculate a negative class component of the list score for each list in the set of lists based on the generated probabilistic model and the background probabilities associated with the one or more entities in each list; and
  compute the list score for each list in the set of lists based on the calculated positive and negative class components of the list score.

30. A machine-readable medium comprising instructions stored therein, which when executed by a system, causes the system to perform operations comprising:
  identifying social connections for a user of a social networking service based on a social graph associated with the social networking service and one or more seed users provided via an interface of the social networking service, the interface executing at a device of the user;
  deriving a set of lists based on the identified social connections, each list in the set of lists corresponding to a social circle including a subset of users of the social networking service;
  determining background probabilities for the subset of users in each list from the set of lists, the background probabilities indicating a frequency that each of the users in the subset appears as a list member in the set of lists;
  calculating a list score for each list in the set of lists based on a number of the one or more seed users in the subset of users in each list and the determined background probabilities associated with the subset of users in each list;
  identifying a subset of lists from the set of lists based on the calculated list scores;
  assigning the calculated list score to the respective users in each list of the identified subset of lists based on the background probabilities associated with the corresponding subset of users;
  ranking the users in each of the identified subset of lists based on the assigned lists scores, so as to identify users related to the one or more seed users; and
  transmitting at least a portion of the ranked users from the identified subset of lists to the device of the user via the interface of the social networking service.

* * * * *